Figures 1, 2:
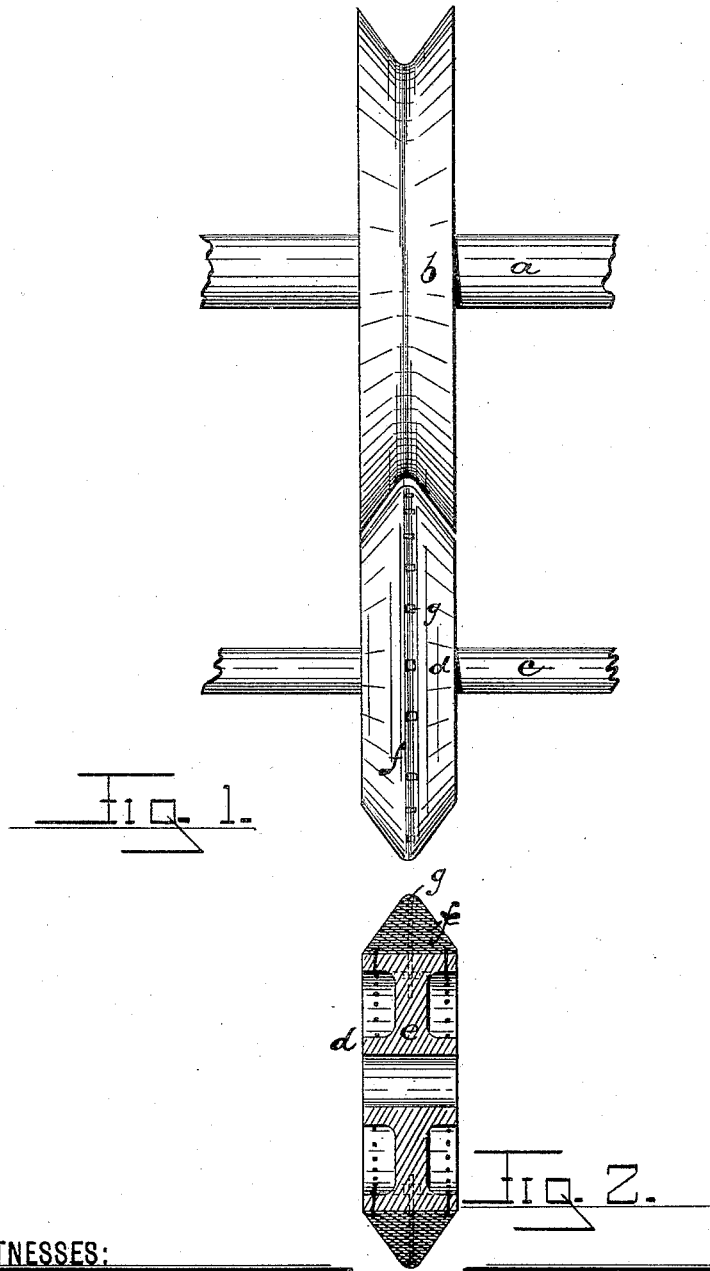

(No Model.)

J. MEIER.
FRICTION WHEEL.

No. 443,102. Patented Dec. 23, 1890.

WITNESSES:
Oscar A. Michel.
L. H. Scott.

INVENTOR:
Joseph Meier,
BY Draker Co ATTY'S.

UNITED STATES PATENT OFFICE.

JOSEPH MEIER, OF NEWARK, NEW JERSEY.

FRICTION-WHEEL.

SPECIFICATION forming part of Letters Patent No. 443,102, dated December 23, 1890.

Application filed March 1, 1890. Serial No. 342,285. (No model.)

*To all whom it may concern:*

Be it known that I, JOSEPH MEIER, a citizen of the United States, residing at Newark, in the county of Essex and State of New Jersey, have invented certain new and useful Improvements in Friction Pulleys or Wheels; and I do hereby declare the following to be a full, clear, and exact description of the invention, such as will enable others skilled in the art to which it appertains to make and use the same, reference being had to the accompanying drawings, and to letters of reference marked thereon which form a part of this specification.

The object of this invention is to avoid in transmitting power the use of leather belts and the disadvantages and objections incident thereto; and it consists in the improved pulley and in the arrangements and combinations of parts thereof, substantially as will be hereinafter set forth, and finally embodied in the claim.

Referring to the accompanying drawings, in which like letters indicate corresponding parts in each of the figures, Figure 1 is a view showing the relation of certain friction wheels or pulleys to one another, and Fig. 2 is a section taken through the center of one of said wheels.

In said drawings, $a$ indicates a main shaft, which may connect with an engine or other motor in any suitable manner.

$b$ is a friction-pulley having a V-shaped groove in its periphery.

$c$ is a shaft connecting with a dynamo-machine or other machine to be operated, and $d$ is a leather-covered wheel arranged on said shaft $c$ and having its periphery made angular in conformity with the said V-shaped groove.

Of said wheel or pulley, $e$ indicates a core or body, which may be of iron, wood, or other appropriate material, and $f$ is a peripheral covering of leather which provides a frictional surface to engage the wheel $b$. This covering is applied in concentric layers, which are graduated in width and are beveled oppositely, as shown, to secure an angular body of leather, as shown in Fig. 3. The first layer is riveted to the body of the flat peripheral face of the wheel and the overlying layers cemented thereto and to one another, and additional bolts $g$ are employed to more perfectly unite the parts, the said bolts passing from points centrally between the beveled faces of the wheel into the said body, as indicated.

What I claim as new is—

The improved friction wheel or pulley herein described, combining therein a body having a straight peripheral face, a series of plies or layers of leather built upon said flat face and forming an oppositely-beveled body, the first layer being riveted to the flat face and the succeeding layers being cemented to one another, and the whole of said parts being united by bolts which pass through said layers or plies and into the said body from points centrally between the two beveled faces of leather, substantially as set forth.

In testimony that I claim the foregoing I have hereunto set my hand this 24th day of February, 1890.

JOSEPH MEIER.

Witnesses:
CHARLES H. PELL,
E. L. SHERMAN.